US009026736B1

(12) United States Patent
Venkat et al.

(10) Patent No.: US 9,026,736 B1
(45) Date of Patent: May 5, 2015

(54) SYSTEM AND METHOD FOR MAINTAINING CACHE COHERENCY

(75) Inventors: Narayan Venkat, Billerica, MA (US); David Franklin Lively, Hudson, MA (US); Kenny W. Speer, Danville, CA (US)

(73) Assignee: NetApp, Inc., Sunnyvale, CA (US)

( * ) Notice: Subject to any disclaimer, the term of this patent is extended or adjusted under 35 U.S.C. 154(b) by 459 days.

(21) Appl. No.: 13/567,484

(22) Filed: Aug. 6, 2012

(51) Int. Cl.
*G06F 12/00* (2006.01)
*G06F 12/08* (2006.01)

(52) U.S. Cl.
CPC .................................. *G06F 12/0877* (2013.01)

(58) Field of Classification Search
USPC .................................................. 711/133, 141
See application file for complete search history.

(56) References Cited

U.S. PATENT DOCUMENTS 6,351,754 B1 * 2/2002 Bridge et al. .......................... 1/1
7,996,621 B2 * 8/2011 Brown et al. ................. 711/133

OTHER PUBLICATIONS

U.S. Appl. No. 13/718,452, filed Dec. 18, 2012, titled "System and Method for an Efficient Cache Warm-up".
U.S. Appl. No. 13/718,578, filed Dec. 18, 2012, titled "System and Method for an Efficient Cache Restart".

\* cited by examiner

*Primary Examiner* — Reginald Bragdon
*Assistant Examiner* — Hamdy S Ahmed
(74) *Attorney, Agent, or Firm* — Kacvinsky Daisak Bluni, PLLC

(57) ABSTRACT

Described herein is a system and method for maintaining cache coherency. The system and method may maintain coherency for a cache memory that is coupled to a plurality of primary storage devices. The system and method may write data to the cache memory and associate the data with a cache generation identification (ID). A different cache generation ID may be associated with each new set of data that is written to the cache memory. The cache generation ID may be written to the primary storage devices. A backup restore operation may be performed on one of the primary storage devices and a backup restore notification may be received. In response to the notification, the system and method may compare the cache generation ID with the generation ID stored on the restored primary storage device and invalidate data stored on the cache memory for the restored primary storage device.

20 Claims, 9 Drawing Sheets

|  | Storage Device 1 | Storage Device 2 | Storage Device 3 |
|---|---|---|---|
| Data 1 | Valid | Valid | Invalid |
| Data 2 | Valid | Invalid | Invalid |
| Data 3 | Valid | Valid | Invalid |

FIG. 9

SYSTEM AND METHOD FOR MAINTAINING CACHE COHERENCY

FIELD

Embodiments of the present disclosure relate to storage systems, and in particular, to maintaining cache coherency.

BACKGROUND

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of storage objects, such as files and logical units (LUs). A known type of file system is a write-anywhere file system that does not overwrite data on disks. An example of a write-anywhere file system that is configured to operate on a storage system is the Write Anywhere File Layout (WAFL®) file system available from NetApp, Inc. Sunnyvale, Calif.

The storage system may be further configured to allow many servers to access storage objects stored on the storage system. In this model, the server may execute an application, such as a database application, that "connects" to the storage system over a computer network, such as a point-to-point link, shared local area network (LAN), wide area network (WAN), or virtual private network (VPN) implemented over a public network such as the Internet. Each server may request the data services of the storage system by issuing access requests (read/write requests) as file-based and block-based protocol messages (in the form of packets) to the system over the network.

A plurality of storage systems may be interconnected to provide a storage system architecture configured to service many servers. In some embodiments, the storage system architecture provides one or more aggregates, each aggregate comprising a set of one or more storage devices (e.g., disks). Each aggregate may store one or more storage objects, such as one or more volumes. The aggregates may be distributed across a plurality of storage systems interconnected as a cluster. The storage objects (e.g., volumes) may be configured to store content of storage objects, such as files and logical units, served by the cluster in response to multi-protocol data access requests issued by servers.

Each storage system (node) of the cluster may include (i) a storage server (referred to as a "D-blade") adapted to service a particular aggregate or volume and (ii) a multi-protocol engine (referred to as an "N-blade") adapted to redirect the data access requests to any storage server of the cluster. In the illustrative embodiment, the storage server of each storage system is embodied as a disk element (D-blade) and the multi-protocol engine is embodied as a network element (N-blade). The N-blade receives a multi-protocol data access request from a client, converts that access request into a cluster fabric (CF) message and redirects the message to an appropriate D-blade of the cluster.

The storage systems of the cluster may be configured to communicate with one another to act collectively to increase performance or to offset any single storage system failure within the cluster. The cluster provides data service to servers by providing access to a shared storage (comprising a set of storage devices). Typically, servers will connect with a storage system of the cluster for data-access sessions with the storage system. During a data-access session with a storage system, a server may submit access requests (read/write requests) that are received and performed by the storage system.

Each storage system may receive read requests for data stored on a primary storage device (e.g., a large capacity storage device such as a disk). In response, the storage system may transmit data from a primary storage device to a client associated with the read request. However, such read requests may take a significant time to respond to and cause performance limitations of the storage system. For example, retrieving and transmitting requested data from a primary storage device in response to a read request may produce a slow response time. Thus, an effective method and system for providing higher response time for read requests of a storage system is needed.

SUMMARY

The embodiments described herein provide a system and method for caching data (for producing faster response times) and managing cache coherency. In some embodiments, a cache memory device may be used to store data for future read requests of data so that the requested data may be more quickly served to a requesting client. For example, the cache memory device may store a copy of some data blocks stored on a primary storage device (e.g., a disk). A read request for a portion of the data stored on the primary storage device may be received by a storage system. If the cache memory device currently stores a copy of the data associated with the read request, then in response to the read request, the data may be retrieved and served from the cache memory device instead of being retrieved and served from the primary storage device. An instance where the cache memory device stores a copy of data associated with a read request may be called a cache hit. Since a primary storage device may be slower than the cache memory device and may be located further away from a storage system receiving the read request, serving the data from the cache memory device instead of the primary storage device may result in better overall performance and response time to the read request.

In some embodiments, a cache memory device may be shared by a plurality of primary storage devices. Each of the primary storage devices may store a relatively large number of data blocks. For each primary storage device, the cache memory device may store a copy of some data blocks stored on the primary storage device. In some embodiments, a data block stored on the cache memory device may be a copy relative to a data block on each of a plurality of primary storage devices (i.e., the data block stored on the cache memory device may be a copy of a data block on a first primary storage device as well as a data block on a second primary storage device). The data blocks stored on the cache memory device that are copied from one or more primary storage devices are referred to as "corresponding" data blocks for the primary storage devices. As such, a corresponding data block stored on the cache memory device may be retrieved and served in response to a cache hit for each of a plurality of primary storage devices.

In some embodiments, a particular primary storage device that shares the cache memory device with other primary storage devices may be subject to a backup restore or other operation that results in the overwriting of all or most of the data stored on the particular primary storage device. As a result of such an operation, the data blocks stored on the cache memory device may no longer comprise a copy of data blocks currently stored on the particular primary storage device (since the data on the particular primary storage device has changed). If the data blocks stored on the cache memory device no longer comprises a copy of data blocks currently stored on the primary storage device, the data blocks may be considered "incoherent" relative to the primary storage device. However, the data blocks stored on the cache memory device may still comprise copies of data blocks currently stored on the other primary storage devices sharing the cache memory device. If the data blocks stored on the cache memory device still comprises a copy of data blocks currently stored on the primary storage device, the data blocks may be considered "coherent" relative to the primary storage device. As such, the data blocks stored on the cache memory device may be incoherent for the particular primary storage device (after the overwriting), but may be coherent for other primary storage devices.

In some embodiments, a cache coherency engine may manage cache coherency for a plurality of primary storage devices. For example, for a primary storage device, the cache coherency engine may identify which of its corresponding data blocks stored on the cache memory device are valid (i.e., coherent) or invalid (i.e., incoherent) relative to each of the primary storage devices.

In some embodiments, data blocks stored on the cache memory device that are identified as valid/coherent relative to one or more corresponding primary storage devices may be retrieved and transmitted from the cache memory device in response to a read request for the data blocks stored on the corresponding primary storage devices. In some embodiments, data blocks stored on the cache memory device that are identified as invalid/incoherent relative to a corresponding primary storage device are not retrieved and transmitted from the cache memory device in response to a read request for the data blocks stored on the corresponding primary storage device. In some embodiments, the cache coherency engine may identify each data block stored on the cache memory device as being valid or invalid relative to each of the primary storage devices that share the cache memory device.

In some embodiments, the cache coherency engine may identify the validity or invalidity of a data block stored on the cache memory device by using a generation identification (ID). For example, as previously discussed, the cache memory device may store copies of data blocks stored on the primary storage devices. The cache memory device and the data blocks stored on the cache memory device may be associated with a generation ID. At each time point that one or more new data blocks are written/stored to the cache memory device, the generation ID for the cache memory device may be modified (e.g., incremented).

In some embodiments, data blocks may be written to the cache memory device at predetermined time periods such that data blocks are written to the cache memory device at specific time intervals. For example, at a first time point, a first set of data blocks may be written to the cache memory device and the first data block set may be associated with a first generation ID. At a later second time point, a second data block set may be written to the cache memory device. In response to the second data block set being written to the cache memory device, a value of the first generation ID may be modified (e.g., incremented) to create a second generation ID. The second data block set that is written to the cache memory device may then be associated with the second generation ID.

As such, over a plurality of time intervals, a plurality of sets of data blocks may be written to the cache memory device, each time interval and data block set being associated with a distinct generation ID. In embodiments whereby the generation ID is incremented at each time interval, the later time intervals (e.g., subsequent writing or storing of data blocks on the cache memory device) may be associated with a higher generation ID value than earlier time intervals (e.g., data blocks that were written to or stored on the cache memory device at an earlier time).

In some embodiments, the cache coherency engine may write the latest (e.g., current or highest value) generation ID of the cache memory device to each of the primary storage devices that share the cache memory device. For example, each time that the generation ID on the cache memory device is modified, the cache coherency engine may write the modified generation ID to each of the primary storage devices that share the cache memory device. In some embodiments, the generation ID may be written to an unused partition of each primary storage device. A partition may correspond to a logical storage unit of a primary storage device. In some embodiments, a primary storage device may comprise at least a first partition for storing client data blocks and a second unused partition. The first partition may store data blocks received from write requests, whereby the stored data blocks may be retrieved and transmitted in response to received read requests. The data blocks in each partition may be kept separate from each other in that client read/write requests are performed in the first partition and are not performed in the second partition. In some embodiments, the cache coherency engine may write the generation IDs to the unused second partition of each primary storage device.

In some embodiments, a particular primary storage device may be subject to a backup restore or other operation resulting in an overwriting of all or a substantial portion (e.g., an entire volume) of the particular primary storage device. Such an operation may be referred to generally as an "overwrite" operation. In some embodiments, an overwrite operation may result in the overwriting of both the data blocks stored in the first partition and the generation ID stored in the second partition of the particular primary storage device. Since the data blocks stored in the first partition have been changed, the corresponding data blocks stored on the cache memory device may no longer be a copy of data blocks stored in the first partition of the particular primary storage device.

In some embodiments, the cache coherency engine may receive the generation ID of the particular primary storage device and compare it to the latest generation ID of the cache memory device. For example, the generation ID of the particular primary storage device may comprise a generation ID from the restored backup of the particular primary storage device.

If the latest/current generation ID of the cache memory device is equal to the generation ID of the primary storage device, then the corresponding data blocks stored on the cache memory device may be determined to be a copy of data blocks stored on the primary storage device, whereby a status of the corresponding data blocks on the cache memory device may then be labeled as valid/coherent relative to the primary storage device. However, if the latest/current generation ID of the cache memory device is not equal to (e.g., higher than) the generation ID of the primary storage device, then at least some of the corresponding data blocks stored on the cache memory device may no longer be a copy of data blocks stored on the primary storage device, and such data blocks are to be identified and their status labeled as invalid/incoherent relative to the primary storage device.

In some embodiments, those corresponding data blocks stored on the cache memory device that are associated with a higher generation ID than the generation ID of the primary storage device may be determined to be invalid/incoherent relative to the primary storage device. For example, a cache generation ID data structure may store information indicating which data blocks stored on the cache memory device are associated with each generation ID. Moreover, a cache status data structure may store a status indicator for each data block stored on the cache memory device relative to each of the primary storage devices sharing the cache memory device. In some embodiments, the cache coherency engine may use the cache generation ID data structure to identify the corresponding data blocks stored on the cache memory device that are associated with a higher generation ID than the generation ID of the primary storage device (the primary storage device that is subject to the overwrite operation). Once such corresponding data blocks have been identified, the cache coherency engine may modify the status indicator (e.g., modify to "invalid") in the cache status data structure of each such identified data block relative to the primary storage device subject to the overwrite operation. Thus, each data block stored on the cache memory device may be marked as valid or invalid relative to each of the primary storage devices.

As such, the cache coherency system and method disclosed herein presents an operating advantage for a storage system environment. For example, caching of data for read requests for a plurality of primary storage devices may be serviced by a single shared cache memory device. Since cache coherency may be managed on a per primary storage device basis, the cache memory device may be continuously operated for longer periods of time instead of simply being reset or erased at shorter time intervals.

BRIEF DESCRIPTION OF THE DRAWINGS

FIG. 9 shows an exemplary cache status data structure in which some embodiments operate.

DETAILED DESCRIPTION

Figure 1:
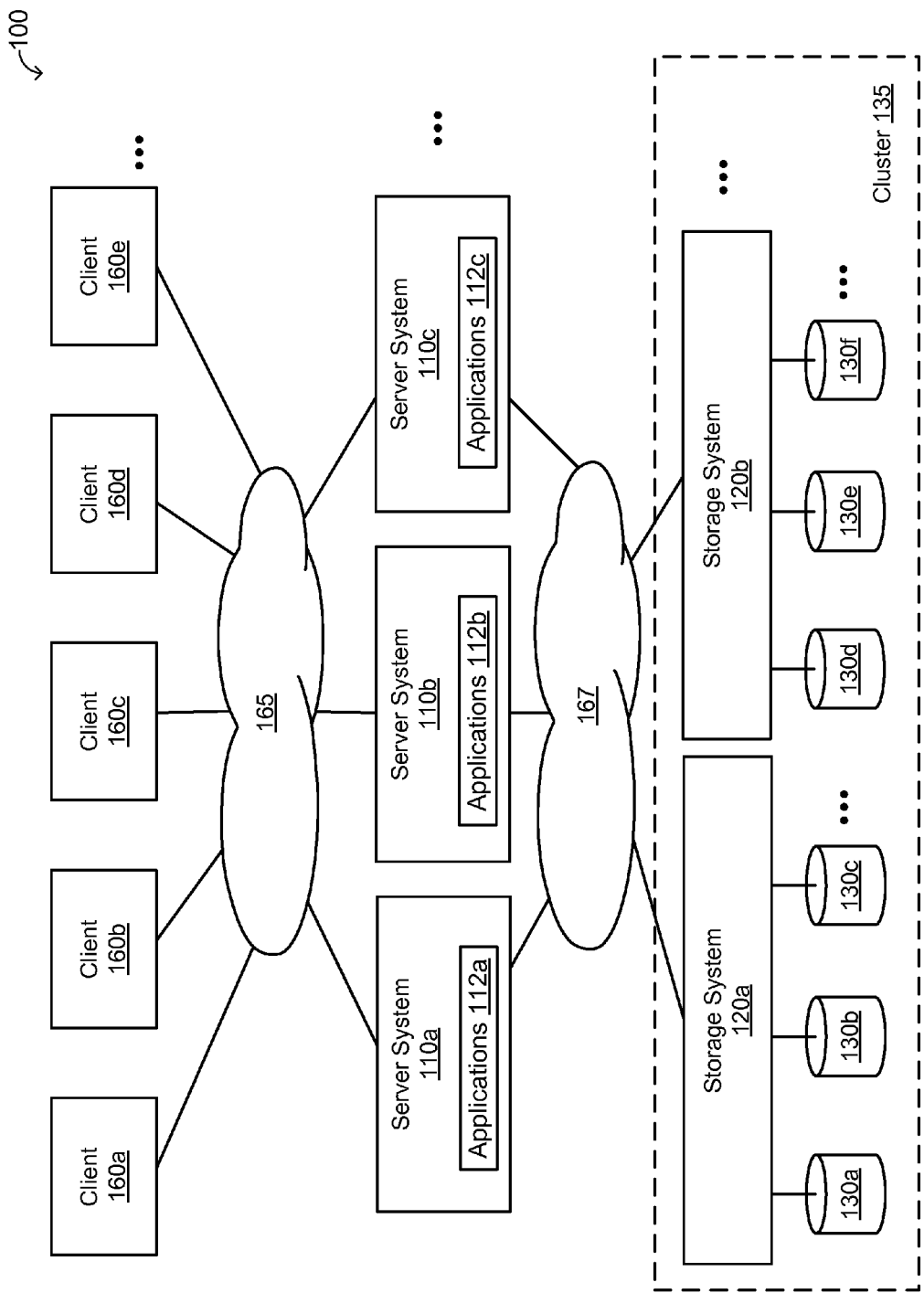
FIG. 1 is a schematic diagram of an exemplary distributed storage system environment in which some embodiments operate.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I contains terms used herein. Section II describes a cluster storage system environment in which some embodiments operate. Section III describes a system and method for maintaining cache coherency.

I. Terms

Cluster storage system: As used herein, a cluster storage system may comprise a set of one or more storage systems. In some embodiments, the cluster may comprise one storage system. As such, the terms "cluster" and "storage system" may sometimes be used interchangeably. In other embodiments, a cluster comprises a plurality of storage systems.

Hypervisor: As used herein, a hypervisor may refer to a virtual machine manager that allows multiple operating systems or applications to run concurrently on a host computer. A hypervisor may be referred to as a 'host.' In some embodiments, the hypervisor may present to a guest operating system a virtual operating system and manages the execution of the guest operating system. In some embodiments, multiple instances of a plurality of operating systems may share virtualized hardware (e.g., storage) resources. A hypervisor may be stored on a storage system or server.

Primary Storage Device: As used herein, a primary storage device may refer to a physical storage device that is not a RAM device for computer data storage. In some embodiments, a primary storage device is a non-volatile storage device. In some embodiments, a primary storage device may have a larger storage capacity than a RAM device and a slower access or response time than a RAM device. A primary storage device may comprise a writable storage device media, such as disk device, video tape, optical, DVD, magnetic tape, and any other similar media adapted to store information. In some embodiments, a primary storage device is not used as a cache memory device and may have larger data capacity and longer response times to read requests than the cache memory device.

Cache Memory Device: As used herein, a cache memory device may refer to a physical device for computer data storage. In some embodiments, the cache memory device may be a random access memory (RAM) or non-volatile RAM (NVRMAM) device. In some embodiments, a RAM device may store data to be directly accessed in any (e.g., random) order. A RAM device may comprise volatile or non-volatile memory. For volatile RAM devices, the stored data is lost if the power to the RAM device is removed. For example, a volatile RAM device may store data, but if the volatile RAM device loses power, then the data may be erased or lost. For non-volatile RAM (NVRAM) devices, the stored data is not lost if the power to the NVRAM device is removed. Examples of RAM devices includes flash memory, Magnetic Random Access Memory (MRAM), Phase Change RAM (PRAM), etc. In some embodiments, a cache memory device may store data so that future read requests may be served faster. For example, the cache memory device may store duplicates or copies of data stored on one or more primary storage devices.

If a read request for data is received and if the requested data is stored in the cache memory device (e.g., a cache hit), then the data may be transmitted from the cache memory device instead of being transmitted from the primary storage device. If the requested data is not stored in the cache memory device (e.g., a cache miss), then the data may be transmitted from the primary storage device. In some embodiments, the cache memory device is faster (e.g., a quicker access time for data stored on the cache memory device) than a primary storage device and may be stored closer to a client requesting data (e.g., on a storage system or a server system).

Cache Coherency: As used herein, cache coherency may refer to the consistency of data stored in a cache memory device. For example, the cache memory device may be a shared cache resource for a plurality of primary storage devices. In some embodiments, the shared cache memory device stores copies or duplicates of data from the primary storage devices. If a primary storage device receives a write request (e.g., changes or modifies data stored on the primary storage device), then the data stored on the primary storage device may be changed. In some embodiments, if such a change is not reflected in the cache memory device, then the data stored on the cache memory device may no longer be a duplicate or copy of the particular piece of data stored on the primary storage device. Such an inconsistency (e.g., a piece of data stored on the cache memory device no longer being a duplicate or copy of data stored on the primary storage device) may be referred to as cache incoherency. In contrast, if the data stored on the cache memory device is a duplicate or copy of the data on the primary storage device, then the data is consistent and such a situation may be referred to as cache coherency.

Partition: As used herein, a partition may refer to a result of dividing a storage device (e.g., a primary storage device or a hard disk drive) into multiple logical storage units. In some embodiments, each of the logical storage units may be referred to as a partition. As such, the single storage device may be treated as if it were multiple storage devices. In some embodiments, a storage device with partitions may allow the separation of different types of data. For example, client data (e.g., data subject to read requests) may be stored in a first partition and subsequent write requests from a client may be written to the first partition. As such, the client data may not be written into the portions of the storage device reserved for a second partition. Moreover, in some embodiments, operating system files or data may be stored in a second partition of the storage device. As such, certain system files or data may be stored separately from client data.

II. Cluster Storage System Environment

FIG. 1 is a block diagram of an exemplary virtual server environment 100 in which some embodiments operate. The environment 100 may comprise a set of one or more server systems 110 (e.g., server systems 110a, 110b, 110c, etc.) connected to one or more client systems 160 (e.g., client systems 160a, 160b, 160c, 160d, 160e, etc.) via a network 165 and one or more storage systems 120. The server systems 110 may each access one or more storage systems 120 (e.g., storage systems 120a, 120b, etc.) that are connected to the server systems 110 via a network 167. The one or more storage systems 120 comprise a cluster storage system 135. Each storage system 120 in the cluster 135 may comprise a set of storage devices 130 (e.g., storage devices 130a, 130b, 130c, etc.) for storing client data, the storage devices 130 of the cluster 135 comprising a shared storage of the storage system 120. Note that the server systems 110 are also connected to each other (e.g., via network 167) for communicating with each other (e.g., for working collectively to provide data-access service to the client systems 160 and for collectively hosting a plurality of virtual machines as described herein).

A client system 160 may comprise a computer system that may interact with a server system 110 for submitting read/write access requests and for receiving or transmitting data from or to the server systems 110 over the network 165. In a virtual server environment, a client system 160 may interact over the network 165 with one or more virtual machines (VMs) executing on a server system 110 for submitting read/write access requests and for receiving or transmitting data from or to the storage system 120 over the network 167.

A server system 110 may comprise a computer system that may execute one or more applications 112 (e.g., applications 112a, 112b, etc.) that interacts with the storage systems 120 and client systems 160 for receiving read/write access requests and receiving or transmitting data over the network 167 and the network 165. In some embodiments, a server system 110 may comprise a chassis hosting multiple instances of server systems 110, each server system 110 hosting multiple client systems embodied as virtual machines. The network 167 and/or subnets of networks 167 may be physically embodied within such a chassis.

An application 112 executing on a server system 110 may provide data-access services to client systems 160 by transmitting and processing access requests for data from the storage system(s) 120. In turn, an application 112 utilizes the services of the storage system 120 to access, store, and manage data in a set of storage devices 130. As such, a server system 110 may execute one or more applications 112 that submit access requests for accessing particular storage objects on the storage devices. Each application 112 may submit access requests for accessing particular storage objects on the storage systems of the cluster 135 and the cluster 135 may perform the received requests on the storage objects. An application 112 may comprises a non-virtual based application, such as a typical email exchange application or database application. In other embodiments, an application 112 may comprise a virtual-based application, such as a virtual machine (discussed below).

A storage system 120 may be coupled locally to a server system 110 over a network 167 such as a local area network (LAN), an Ethernet subnet, a PCI or PCIe subnet, a switched PCIe subnet, a wide area network (WAN), a metropolitan area network (MAN), the Internet, or the like. In some embodiments, a server system 110 may comprise a chassis hosting multiple instances of server systems 110 within a single chassis (e.g., a blade server chassis), with each instance of a server system 110 in communication with each other instance of a server system 110 in the chassis via network 167.

Interaction between the server systems 110 and the storage system(s) 120 can enable the provision of storage services. That is, the server systems 110 may request the services of the storage system(s) 120 (by submitting read/write access requests), and the storage system(s) 120 may respond to read/write access requests of the server systems 110 by receiving or transmitting data to the server systems 110 over the network 167 (e.g., by exchanging data packets through a connection over the network 167).

Communications between a storage system 120 and any of server systems 110 are typically embodied as packets sent over the computer network 167. A server system 110 may send an access request (a read/write access request) to the storage system 120 for accessing particular data stored on the storage system. The server system 110 may request the services of the storage system 120 by issuing storage-access protocol messages formatted in accordance with a conventional storage-access protocol for accessing storage devices (such as CIFS, NFS, etc.). Access requests (e.g., read/write access requests) may be implemented by issuing packets using file-based access protocols—such as the Common Internet File System (CIFS) protocol or Network File System (NFS) protocol—over the Transmission Control Protocol/Internet Protocol (TCP/IP) when accessing data in the form of files and directories. Alternatively, the server system 110 may issue access requests by issuing packets using block-based access protocols—such as the Fibre Channel Protocol (FCP), Fibre Channel over Ethernet (FCoE), or Internet Small Computer System Interface (iSCSI) Storage Area Network (SAN) access—when accessing data in the form of blocks.

Each application 112 executing on a server system 110 may utilize services of the cluster 135 to store and access its data. The storage system 120 may comprise a computer system that stores data in a set of one or more storage devices 130 as storage objects. A storage device 130 may comprise writable storage device media such as storage devices, video tape, optical devices, DVD, magnetic tape, flash memory, Magnetic Random Access Memory (MRAM), Phase Change RAM (PRAM), or any other similar media adapted to store information (including data and parity information).

As known in the art, a storage device 130 may comprise storage objects comprising one or more storage volumes, where each volume has a file system implemented on the volume. A file system implemented on the storage devices 130 may provide multiple directories in a single volume, each directory containing zero or more filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), UNIX® file system, and the like. For the Data ONTAP® storage operating system (available from NetApp, Inc. of Sunnyvale, Calif.) which may implement a Write Anywhere File Layout (WAFL®) file system, there is typically a WAFL file system within each volume, and within a WAFL file system, there may be one or more logical units (LUs).

Figure 2:
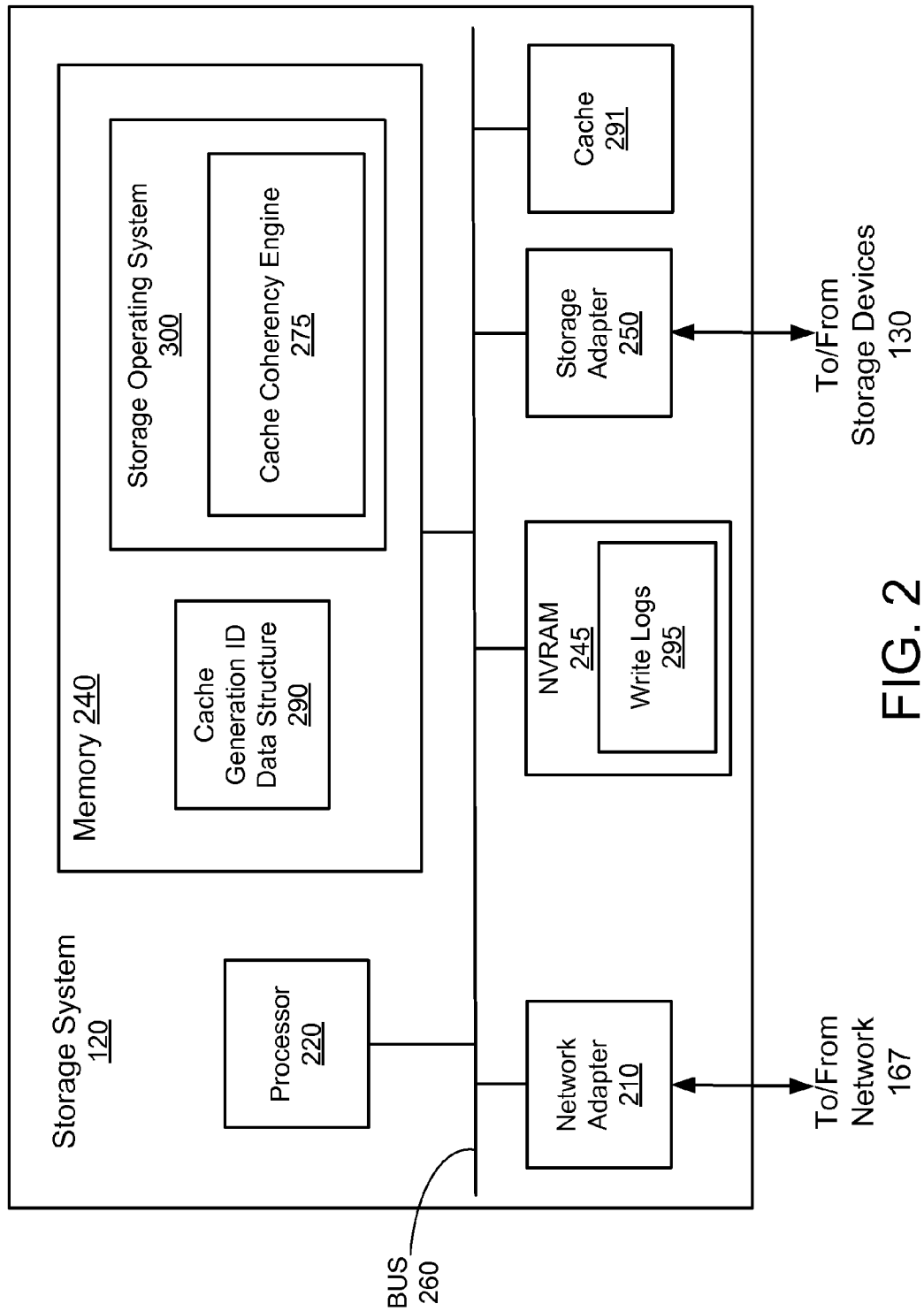
FIG. 2 is a schematic block diagram of an exemplary storage system that may be employed in the storage system environment of FIG. 1.

FIG. 2 is a schematic block diagram of an exemplary storage system 120 that may be employed in the storage system environment of FIG. 1. Those skilled in the art will understand that the embodiments described herein may apply to any type of special-purpose computer (e.g., storage system) or general-purpose computer, including a standalone computer, embodied or not embodied as a storage system. To that end, storage system 120 can be broadly, and alternatively, referred to as a computer system. Moreover, the teachings of the embodiments described herein can be adapted to a variety of storage system architectures including, but not limited to, a network-attached storage environment, a storage area network and disk assembly directly-attached to a server computer. The term "storage system" should, therefore, be taken broadly to include such arrangements.

The storage system 120 comprises a network adapter 210, a processor 220, a memory 240, a non-volatile random access memory (NVRAM) 245, and a storage adapter 250 interconnected by a system bus 260. The network adapter 210 comprises the mechanical, electrical and signaling circuitry needed to connect the storage system 120 to a server system 110 over a computer network 150. The storage system may include one or more network adapters. Each network adapter 210 has a unique IP address and may provide one or more data access ports for server systems 110 to access the storage system 120 (where the network adapter accepts read/write access requests from the server systems 110 in the form of data packets). In some embodiments, the storage adapter 250 and the network adapter 210 may comprise a single unified target adapter (UTA) that may be used to perform the functionality of both the storage adapter 250 and the network adapter 210.

The memory 240 comprises storage locations that are addressable by the processor 220 and adapters for storing software program code and data. The memory 240 may comprise a form of random access memory (RAM) that is generally cleared by a power cycle or other reboot operation (e.g., it is a "volatile" memory). In other embodiments, however, the memory 240 may comprise a non-volatile form of memory that does not require power to maintain information. The processor 220 and adapters may, in turn, comprise processing elements and/or logic circuitry configured to execute the software code and manipulate the data stored in the memory 240.

The storage system 120 may also include a NVRAM 245 that may be employed as a backup memory that ensures that the storage system 120 does not "lose" received information, e.g., CIFS and NFS requests, in the event of a system shutdown or other unforeseen problem. The NVRAM 245 is typically a large-volume solid-state memory array having either a back-up battery, or other built-in last-state-retention capabilities (e.g. a FLASH memory), which holds the last state of the memory in the event of any power loss to the array. Therefore, even if an access request stored in memory 240 is lost or erased (e.g., due to a temporary power outage) it still may be recovered from the NVRAM 245. The write logs or write requests 295 may be stored, for example, to the NVRAM 245 (as shown in FIG. 2).

The processor 220 executes a storage operating system application 300 of the storage system 120 that functionally organizes the storage system by, inter alia, invoking storage operations in support of a file service implemented by the storage system. In some embodiments, the storage operating system 300 comprises a plurality of software layers (including a cache coherency engine) that are executed by the processor 220. Portions of the storage operating system 300 are typically resident in memory 240. It will be apparent to those skilled in the art, however, that other processing and memory means, including various computer readable media, may be used for storing and executing program instructions pertaining to the storage operating system 300.

In some embodiments, a cache generation ID data structure 290 is also resident in memory 240. In other embodiments, the cache generation ID data structure 290 may also be resident in NVRAM 245 or stored on a cache memory device 291. As discussed below, in some embodiments, the cache generation ID data structure 290 is produced and used by the cache coherency engine 275 to store metadata for maintaining cache coherency.

The storage adapter 250 cooperates with the storage operating system 300 executing on the storage system 120 to access data requested by the server system 110. The data may be stored on the storage devices 130 that are attached, via the storage adapter 250, to the storage system 120 or other node of a storage system as defined herein. The storage adapter 250 includes input/output (I/O) interface circuitry that couples to the storage devices 130 over an I/O interconnect arrangement, such as a conventional high-performance, Fibre Channel serial link topology. In response to an access request received from a server system 110, data may be retrieved by the storage adapter 250 and, if necessary, processed by the processor 220 (or the adapter 250 itself) prior to being forwarded over the system bus 260 to the network adapter 210, where the data may be formatted into a packet and returned to the server system 110.

In an illustrative embodiment, the storage devices 130 may comprise disk devices that are arranged into a plurality of volumes, each having a file system associated therewith. In some embodiments, the storage devices 130 comprise disk devices that are configured into a plurality of RAID (redundant array of independent disks) groups whereby multiple storage devices 130 are combined into a single logical unit (i.e., RAID group). In a typical RAID group, storage devices 130 of the group share or replicate data among the disks that may increase data reliability or performance. The storage devices 130 of a RAID group are configured so that some disks store striped data and at least one disk stores separate parity for the data, in accordance with a preferred RAID-4 configuration. However, other configurations (e.g. RAID-5 having distributed parity across stripes, RAID-DP, etc.) are also contemplated. A single volume typically comprises a plurality of storage devices 130 and may be embodied as a plurality of RAID groups.

The organization of a storage operating system 300 for the exemplary storage system 120 is now described briefly. However, it is expressly contemplated that the principles of the embodiments described herein can be implemented using a variety of alternative storage operating system architectures. As discussed above, the term "storage operating system" as used herein with respect to a storage system generally refers to the computer-executable code operable on a storage system that implements file system semantics (such as the above-referenced WAFL®) and manages data access. In this sense, Data ONTAP® software is an example of such a storage operating system implemented as a microkernel. The storage operating system can also be implemented as an application program operating over a general-purpose operating system, such as UNIX® or Windows®, or as a general-purpose operating system with configurable functionality.

III. Maintaining Cache Coherency

Figure 3:
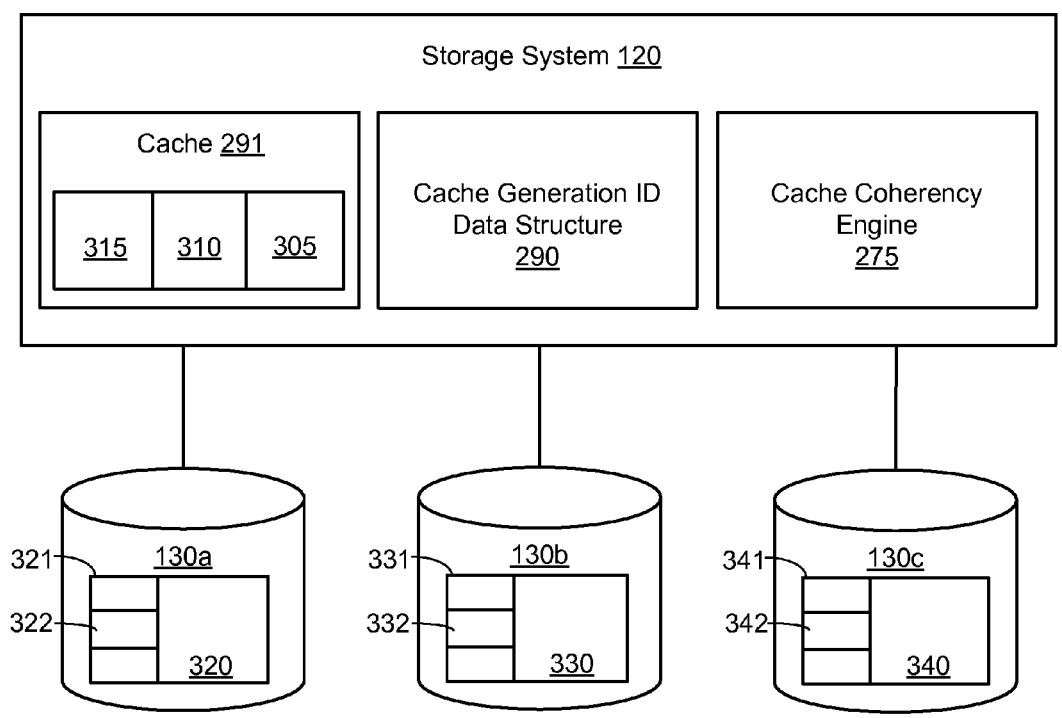
FIG. 3 is a schematic block diagram of an environment to maintain cache coherency in which some embodiments operate.

FIG. 3 is a schematic block diagram of an exemplary environment for maintaining cache coherency. A storage system 120 may be coupled to and manage a plurality of primary storage devices 130. For example, the storage system 120 may receive read requests (e.g., from a server system 110 and/or client 160) for data stored on one or more of the primary storage devices 130. In response to the request, the storage system 130 may transmit data from a primary storage device 130 to a server system (e.g., server system 110) associated with the read request from a client (e.g., client 160). In some embodiments, the storage system 120 may comprise a cache memory 291 to store data from the primary storage devices. For example, the cache memory 291 may store a subset of data stored on the primary storage devices 130. As such, the data stored on the cache memory 291 may be a duplicate or copy of data stored on one or more primary storage devices 130. In some embodiments, the data stored in the cache memory 291 may be data that is associated with a large number of read requests. As such, the cache memory 291 may store a copy of data from the primary storage devices 130 that is associated with a large number of read requests and data from the primary storage devices 130 that are not associated with a large number of read requests may not be copied to the cache memory 291. The storage system 120 may transmit data from the cache memory 291 in response to a read request for data stored in the primary storage devices 130. For example, if the cache memory 291 of the storage system 120 contains the data associated with the read request (e.g., a cache hit), then the storage system 120 may transmit the data from the cache memory 291 instead transmitting the data from the primary storage devices 130. In some embodiments, the cache memory 291 may be associated with a faster data access time than a primary storage device 130. As such, the transmitting of data from the cache memory 291 may take less time than the transmitting of the same data from a primary storage device 130. Moreover, since the storage system 120 comprises the cache memory 291, the transmitting of data from the cache memory 291 does not have the extra distance associated with the transmitting of the data from the storage devices 130.

As shown in FIG. 3, the cache memory 291 may comprise a plurality of types of data. For example, the cache memory 291 may comprise a cache memory generation ID 315, cache status 310, and data 305. In some embodiments, the data 305 is copied from the primary storage devices 130. For example, the data 305 may be a duplicate of data stored on the primary storage devices 130. As such, the data 305 may be the data transmitted from the storage system 120 to a server system 110 in response to a read request from a client 160 for data stored in a primary storage device 130 (e.g., a cache hit). The cache status 310 may contain information to identify whether a particular data or data block stored on the cache memory 291 is valid or invalid (e.g., coherent or incoherent) for a particular primary storage device 130, as will be discussed in further detail below.

As shown in FIG. 3, the storage system 120 may further comprise a cache coherency engine 275. In some embodiments, the cache coherency engine 275 may maintain the coherency of data of the cache memory 291 with regard to the primary storage devices 130. For example, the cache coherency engine 275 may ensure that data transmitted from the cache memory 291 of the storage system 120 in response to a read request for data stored in the primary storage devices 130 is a duplicate or copy of the data stored on the primary storage devices. In some embodiments, the cache coherency engine 275 may use a cache generation ID data structure 290 to determine if the data or a portion of the data stored on the cache memory 291 is a duplicate or copy of the corresponding data stored on one or more primary storage devices 130.

In some embodiments, each of the primary storage devices 130 may be partitioned. As such, each of the primary storage devices 130 may comprise two or more partitions. In some embodiments, the partitioning of a primary storage device involves the dividing of the primary storage device into multiple logical storage units (e.g., partitions). For example, the primary storage devices 130 may each comprise a first partition (e.g., a first partition 320, 330, and/or 340) comprising stored data (e.g., data subject to read requests from a client 160 and/or an area of the primary storage device available for new data from a client 160 and/or server system 110 to be stored) and a second partition (e.g., a second partition 321, 331, and/or 341). In some embodiments, the second partition may be an unused partition of the primary storage device 130. For example, write requests of data to the primary storage devices 130 may only involve the writing of data associated with the write request to the first partition (e.g., first partition 320, 330, and/or 340) of the primary storage devices 130. As such, data associated with the write requests are not written to or stored in the unused second partition of the primary storage devices 130. Thus, each primary storage device 130 may comprise a first partition used for storing data for read and/or write requests and a second partition that is not used for storing data associated with the read and/or write requests from clients.

As shown in FIG. 3 and discussed above, the storage system 120 (and/or a server system 110) may comprise a cache coherency engine 275. In some embodiments, the cache coherency engine 275 may maintain cache coherency of the cache memory 291 relative to the primary storage devices 130. For example, the cache coherency engine 275 may ensure that data transmitted from the cache memory 291 is a duplicate or copy of data stored in the primary storage devices 130. In some embodiments, the cache coherency engine 275 may maintain coherency between the cache memory 291 and the primary storage devices 130 by using a cache memory generation ID 315, a cache status 310, cache generation ID data structure 290, and/or a generation ID stored in the unused second partition of the primary storage devices 130 (e.g., data blocks 322, 332, and/or 342 of unused second partitions 321, 331, and/or 341). Further details with regard to maintaining coherency between the cache memory 291 and the primary storage devices 130 are discussed with regard to FIGS. 4-9.

Figure 4:
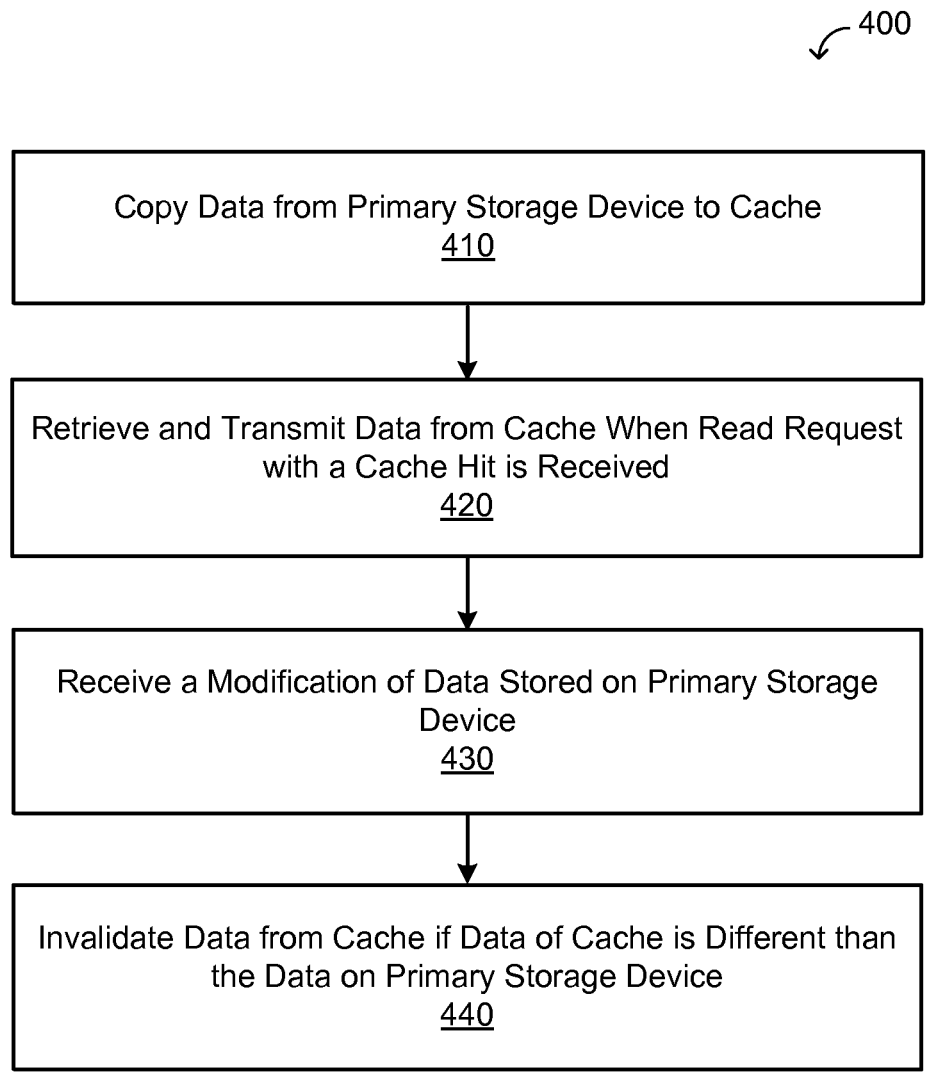
FIG. 4 is a flowchart of a technique to invalidate incoherent data of a cache memory associated with a primary storage device in accordance with some embodiments.

FIG. 4 is a flowchart of a technique 400 to invalidate incoherent data of a cache memory associated with at least one primary storage device in accordance with some embodiments. In general, the technique 400 maintains coherency between data stored by a cache memory (e.g., cache memory 291) and data stored by at least one storage device (e.g., primary storage devices 130). For example, the technique 400 may ensure that the data stored on the cache memory 291 is a duplicate or copy of the corresponding data stored in the primary storage device 130. In some embodiments, the storage system 120 and/or the cache coherency engine 275 of the storage system 120 may perform the technique 400. The technique 400 is described in relation to FIG. 3, which conceptually illustrates the steps of the technique 400. In some embodiments, the technique 400 may maintain coherency of data stored on a cache memory and data stored on a primary storage device without human initiation, interaction, or intervention. In some embodiments, particular steps of the technique 400 may be performed automatically, without human initiation, interaction, or intervention, while other steps of the technique 400 may be performed with human interaction.

In some embodiments, some of the steps of technique 400 are performed or caused to be performed by a cache coherency engine 275 on a storage operating system 300 of a storage system 120. The cache coherency engine 275 may be configured to operate in conjunction with other software modules of the storage system 120, server system 110, and software modules of the storage operating system 300 to collectively perform the embodiments described herein.

The technique 400 begins by copying (at step 410) data from at least one primary storage device (e.g., primary storage device 130) to a cache memory (e.g., cache memory 291). In some embodiments, a subset of data (e.g., data from a first partition 320, 330, and/or 340 of the primary storage devices) that has recently been requested (e.g., associated with a read request) or that has been selected may be copied to the cache memory device. As such, the cache memory may store a subset of data stored from a plurality of primary storage devices. In some embodiments, portions of data stored in the cache memory may be duplicates or copies of data from a plurality of the primary storage devices. Thus, data may be copied to the cache memory such that the data is a duplicate of data stored in multiple primary storage devices.

The technique 400 may further retrieve and/or transmit (at step 420) data from the cache memory when a read request associated with data stored on the primary storage devices is received (e.g., a cache memory hit). For example, as described with relation to step 410, the cache memory may store a copy of data from the primary storage devices. If the storage system comprising the cache memory receives a read request for data that is stored on the primary storage devices, the copied or duplicated data on the cache memory may be transmitted in response to the read request. In some embodiments, such an instance where a read request is for data of a primary storage device where the cache memory is storing a duplicate copy of the requested data may be termed as a cache hit. In response to an identification of a cache hit, the storage system may transmit or fetch the data from the cache memory instead of transmitting or fetching the data from a primary storage device. The technique 400 may further receive or identify (at step 430) a modification of data stored on at least one of the primary storage devices. For example, the storage system 120 may receive a write request of data or a backup restore notification to at least one of the primary storage devices 130. In some embodiments, the write request may overwrite data stored on the primary storage device in response to new data associated with the write request. As such, over time, the data currently stored on the cache memory (e.g., data previously copied to the cache memory from the primary storage devices) may no longer be duplicates of data stored on one or more of the primary storage devices. In some embodiments, data stored on the cache memory that is no longer a duplicate of data stored on one or more primary storage devices is considered to be incoherent relative to the primary storage device with the modified data. In some embodiments, the modification of data on the primary storage devices may be the result of a backup restore of a primary storage device. The technique 400 may further invalidate (at step 440) data stored on the cache memory. For example, data stored on the cache memory that is incoherent relative to data stored on a primary storage device may be invalidated. In some embodiments, the data stored on the cache memory may be invalidated on a per data block and per primary storage device basis. For example, at a first time period, the cache memory may store a duplicate copy of data that is shared by a first primary storage device and a second primary storage device. As such, at the first time period, the data stored on the cache memory, the corresponding data stored on the first primary storage device, and the corresponding data stored on the second primary storage device may all be considered duplicates of each other. At a second time period (e.g., after the modification of data following a write request at step 430 and/or a backup restore of a primary storage device), the corresponding data of one of the primary storage devices may be changed or modified. For example, a write request may change or modify the data of the first primary storage device but not change or modify the data of the second primary storage device. As such, in such an instance, the data stored on the cache memory may be coherent (e.g., a duplicate) of the corresponding data stored on the second primary storage device, but the data stored on the cache memory may be incoherent (e.g., no longer a duplicate) of the data stored on the first primary storage device. In some embodiments, such data of the cache memory relative to the first primary storage device may be marked as invalid, but the same data may be maintained as valid relative to the second primary storage device.

Figure 5:
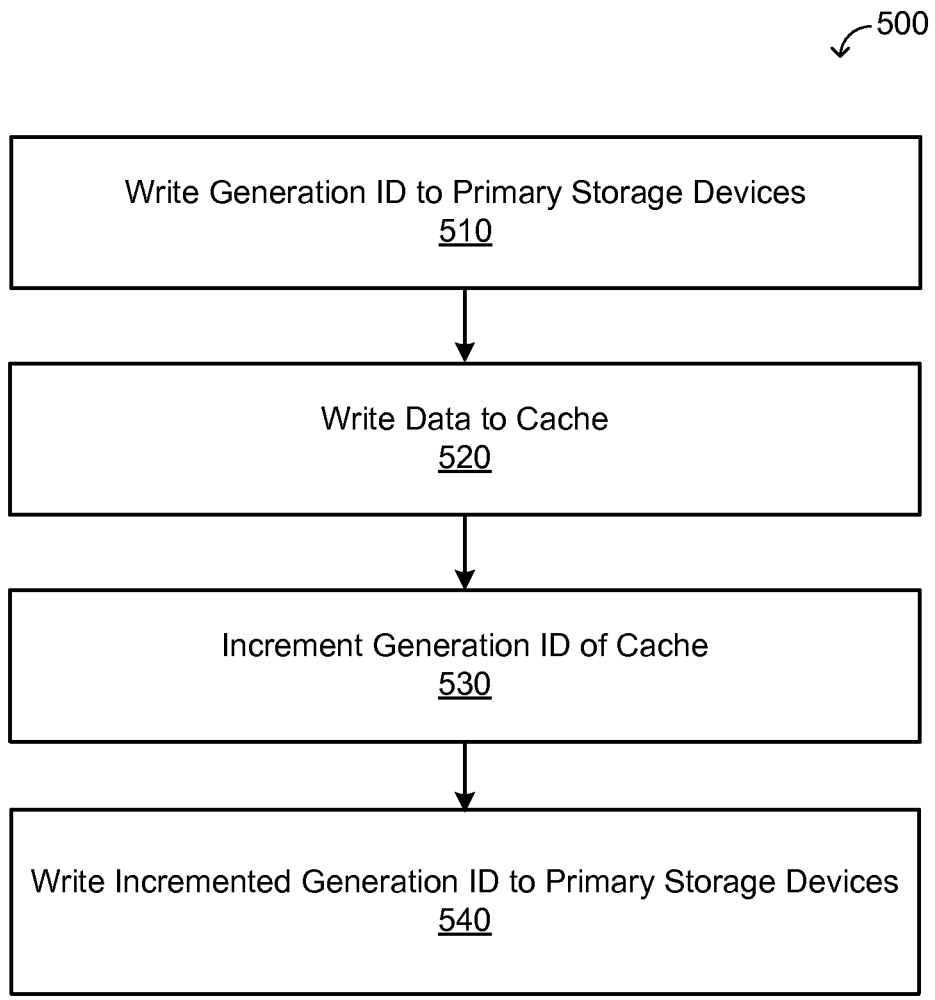
FIG. 5 is a flowchart of a technique to increment a generation ID associated with a cache memory and writing the incremented generation ID to one or more primary storage devices in which some embodiments operate.

FIG. 5 is a flowchart of a technique 500 to increment a generation ID associated with a cache memory (e.g., cache memory 291) and writing the incremented generation ID to one or more primary storage devices (e.g., primary storage devices 130) in which some embodiments operate. In general, the technique 500 may write a generation ID to one or more primary storage devices and update the generation ID written to the one or more primary storage devices after the generation ID has been incremented in a cache memory.

In some embodiments, some of the steps of technique 500 are performed or caused to be performed by the cache coherency engine 275 on a storage operating system 300 of a storage system 120. The cache coherency engine 275 may be configured to operate in conjunction with other software modules of the storage system 120, server system 110, and software modules of the storage operating system 300 to collectively perform the technique 500 as disclosed herein.

The technique 500 may write a cache memory generation ID (e.g., cache memory generation ID 315) to a portion of an unused partition of a primary storage device (e.g., data block 322, 332, and/or 342). In some embodiments, if an event notification is received (e.g., a write to a cache or an elapse of a time period), then data (e.g., the cache memory generation ID) from the cache memory is copied to an unused partition of one or more primary storage devices.

As shown in FIG. 5, the technique 500 may write (at step 510) data from a cache memory (e.g., cache memory 291) to one or more primary storage devices (e.g., primary storage devices 130). For example, the cache coherency engine 275 of a storage system 120 may transmit a generation ID 315 from a cache memory 291 to an unused partition of a primary storage device 130. In some embodiments, the generation ID may be transmitted to a plurality of primary storage devices. For example, the generation ID may be copied to a data block 321 of an unused partition 321, a data block 331 of an unused partition 331, and a data block 342 of an unused partition 341, where each of the unused partitions 321, 331, and 341 correspond to a separate primary storage device 130. In some embodiments, the generation ID may correspond to a version of data stored by the cache memory. The technique 500 may write (at step 520) data to the cache memory. For example, in response to read and/or write requests received by the storage system 120 with regard to data stored on the primary storage devices 130, the data stored on the cache memory 291 may be changed or modified. In response to such a modification of data stored on the cache memory, the technique may increment (at step 530) the generation ID of the cache memory. For example, the value of the generation ID 315 may be increased. As such, a numerical value of the generation ID of the cache memory may be increased in response to new data being written to the cache memory. The technique 500 may further write (at step 540) the incremented generation ID of the cache memory to one or more primary storage devices. In some embodiments, the incremented generation ID may be copied to a data block of an unused partition of a primary storage device that stored the previous generation ID. For example, the incremented generation ID stored at generation ID block 315 may be copied to a data block 322 of an unused partition 321, a data block 332 of an unused partition 331, and a data block 342 of an unused partition 341, where each of the unused partitions 321, 331, and 341 correspond to a separate primary storage device 130. In the same or alternative embodiments, the incremented generation ID may be copied to the data block of the unused partition of the primary storage device in response to the writing of data to the cache memory or after a elapse of a certain period of time (e.g., the incremented generation ID may be copied to the primary storage devices periodically). In some embodiments, if a primary storage device 130 is offline, unable to communicate with the cache memory, or has been subject to a backup restore, then the generation ID stored on the data block of the unused partition of the primary storage device may not be identical to the generation ID currently stored at generation ID block 315 of the cache memory 291.

As such, the technique 500 may write a generation ID to one or more primary storage devices. The technique 500 may further increment a generation ID currently associated with a cache memory when new data is written to the cache memory. Furthermore, the technique 500 may write the incremented generation ID to one or more primary storage devices.

Figure 6:
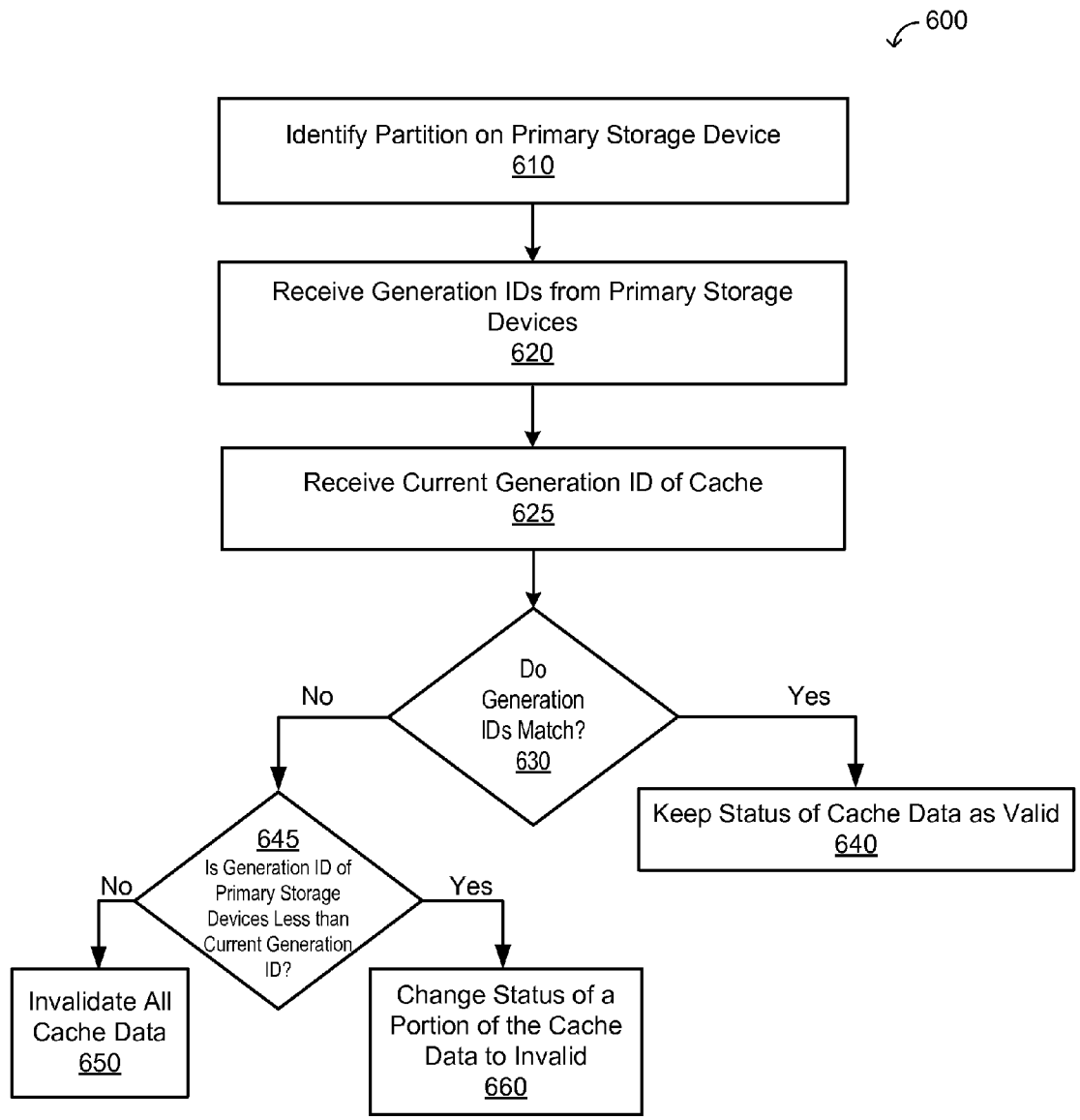
FIG. 6 is a flowchart of a technique to mark or flag data stored on a cache memory as invalid relative to at least one primary storage device in which some embodiments operate.

FIG. 6 is a flowchart of a technique 600 to mark or flag data stored on the cache memory (e.g., cache memory 291) as invalid relative to at least one primary storage device (e.g., primary storage device 130) in which some embodiments operate. In general, the technique 600 may invalidate all data or a portion of data stored on a cache memory relative to a particular primary storage device based on a generation ID currently associated with the cache memory and a generation ID stored on the particular primary storage device. In some embodiments, some of the steps of technique 600 are performed or caused to be performed by the cache coherency engine 275 on a storage operating system 300 of a storage system 120. The cache coherency engine 275 may be configured to operate in conjunction with other software modules of the storage system 120, server system 110, and software modules of the storage operating system 300 to collectively perform the technique 600 as disclosed herein.

As shown in FIG. 6, the technique 600 may identify (at step 610) an unused partition on a primary storage device. For example, a data block of an unused partition of a primary storage device 130 that stores a generation ID copied from a cache memory 291 may be identified. The technique 600 may receive (at step 620) the generation ID stored on a primary storage device. For example, the cache coherency engine 275 may receive a generation ID stored on a data block of an unused partition of a primary storage device 130. The technique 600 may further receive (at step 625) a generation ID currently associated (e.g., the latest and/or highest value) with a cache memory. For example, the cache coherency engine 275 may receive a generation ID from a generation ID data block 315 of a cache memory 291. Furthermore, the technique 600 may compare (at step 630) the generation ID received from the primary storage device (e.g., from step 620) to the current generation ID received from the cache memory (e.g., from step 625). In some embodiments, the comparison of the generation ID received from the primary storage device to the current generation ID received from the cache memory device may comprise determining if the generation IDs match. For example, if the numerical values of the generation ID from the primary storage device are identical to the numerical value of the current generation ID received from the cache memory, then the technique 600 may keep or maintain (at step 640) the data stored on the cache memory device as valid (e.g., coherent) relative to the primary storage device. However, if the generation ID received from the primary storage device does not match the current generation ID received from the cache memory device, then the technique 600 may determine (at step 645) if the generation ID received from the primary storage device is less than the current generation ID received from the cache memory device. If the generation ID received from the primary storage device is not less than the current generation ID received from the cache memory (e.g., the numerical value of the generation ID associated with the primary storage device is of greater value than the numerical value of the current generation ID received from the cache memory), then all of the data stored on the cache memory may be invalidated relative to the primary storage device. In some embodiments, the technique 600 may further invalidate all of the data stored on the cache memory relative to the primary storage device if the generation ID received from the primary storage device is invalid (e.g., the data corresponding to the generation ID was corrupted). In the same or alternative embodiments, the technique 600 may further invalidate all of the data stored on the cache memory relative to the primary storage device if the generation ID received from the primary storage device has a numerical value of zero. As such, the data stored on the cache memory may be invalidated (e.g., marked as incoherent) relative to a primary storage device if the generation ID of the primary storage device is invalid, zero, or greater than the current generation ID received from the cache memory. However, if the technique 600 determines (at step 645) that the generation ID received from the primary storage device is less than the current generation ID received from the cache memory, then the technique 600 may invalidate (at step 660) a portion of the data stored on the cache. In some embodiments, the invalidation of the portion of data may be based on the generation IDs received from the primary storage device and the cache memory. Further details with regard to invalidating (e.g., marking as incoherent or indicating as invalid) a portion of the data are discussed in further detail with regard to FIG. 7

As such, the technique 600 may receive a generation ID stored on an unused partition of a primary storage device and a current generation ID stored on a cache memory. If the generation ID of the primary storage device matches the current generation ID of the cache memory, then the technique 600 may maintain the coherency or validity of the data on the cache memory for the primary storage device. However, if the generation ID of the primary storage device does not match the current generation ID of the cache memory, then at least a portion of the data stored on the cache memory may be marked as invalid or incoherent with regard to the primary storage device.

Figure 7:
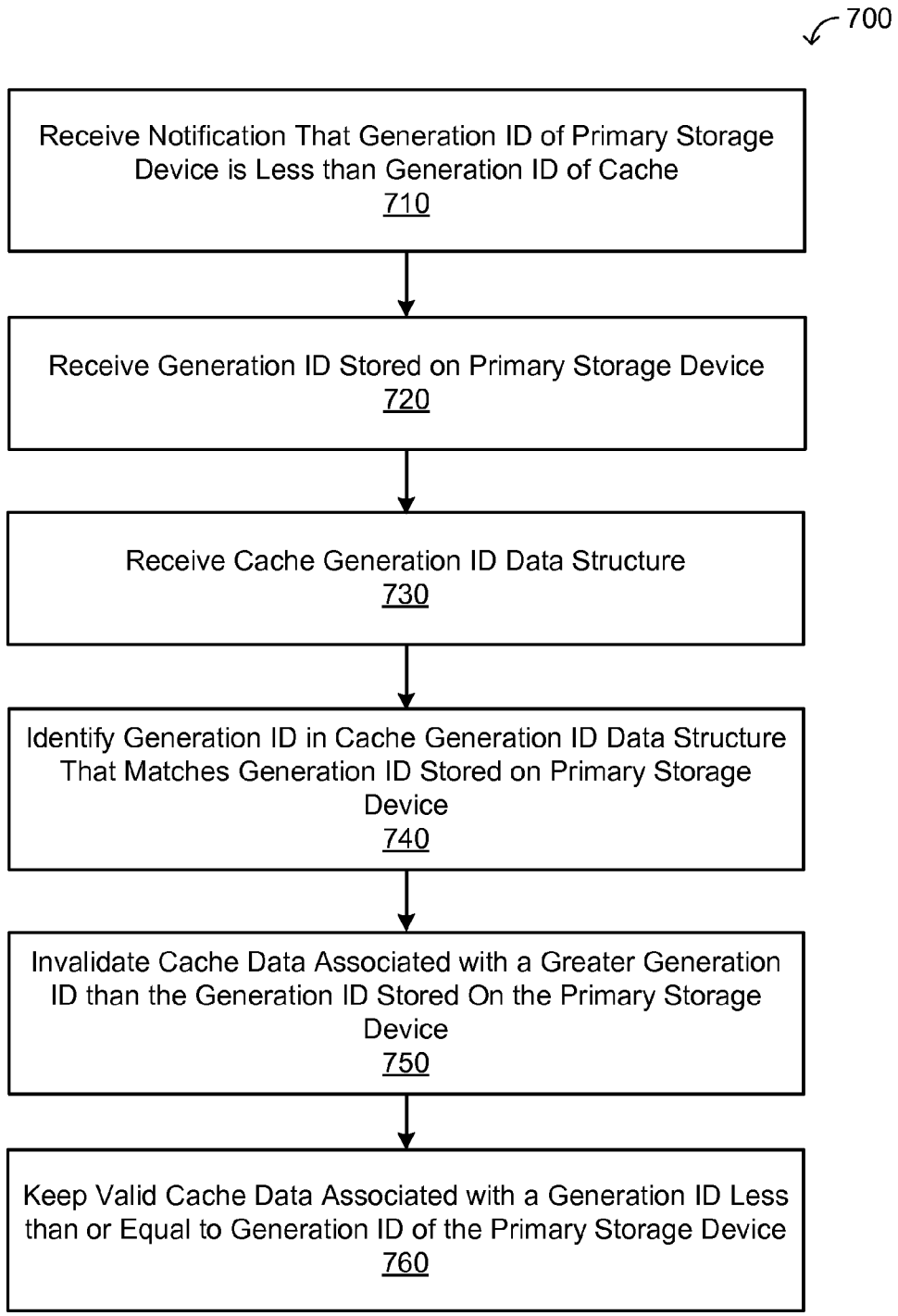
FIG. 7 is a flowchart of a technique to invalidate data stored on a cache memory relative to a primary storage device based on a generation ID in accordance with some embodiments.

FIG. 7 is a flowchart of a technique 700 for invalidating data stored on a cache memory relative to a primary storage device based on a generation ID in accordance with some embodiments. In general, the technique 700 may invalidate a portion of the data stored on the cache memory based on a difference between the generation IDs associated with the data stored on the cache memory and the generation ID stored on the primary storage device. A cache coherency engine 275 may perform the technique 700. In some embodiments, the cache coherency engine 275 may perform the technique 700 in response to a notification that a primary storage device has been subject to a backup restore operation. The technique 700 may receive (at step 710) a notification that a generation ID stored on a primary storage device is less than the current generation ID of the cache memory. In some embodiments, the current generation ID of the cache memory may correspond to the latest (e.g., highest value or last incremented) generation ID of the cache memory. For example, the current generation ID may correspond to the generation ID associated with the latest or most recent data written to the cache memory. As such, the technique 700 may receive a notification that the generation ID stored on the primary storage device is less than the generation ID of the most recent data written to and thus stored on the cache memory. In some embodiments, the notification that the generation ID stored on the primary storage is less than the generation ID of the most recent data stored on the cache memory may be received after the primary storage attaches to (e.g., uses) the cache memory. In some embodiments, the cache coherency engine 275 receives the notification that the generation ID stored on a primary storage 130 is less than the generation ID of the most recent data stored on the cache memory 291. The technique 700 may further receive (at step 720) the generation ID stored on the primary storage device. For example, the cache coherency engine 275 may receive the generation ID stored on a data block (e.g., data block 322, 332, and/or 342) of a partition (e.g., partition 321, 331, and/or 341) of a primary storage device 130. The technique 700 may receive (at step 730) a cache generation ID data structure. For example, the cache coherency engine 275 may receive the cache generation ID data structure 290. In some embodiments, the cache generation ID data structure may comprise one or more generation IDs and data associated with the one or more generation IDs. For example, data may be written to the cache memory at particular instances or intervals and each time that data is written to the cache memory the generation ID of the cache memory may be incremented. In some embodiments, the cache generation ID data structure stores an identification of the data that was written to the cache memory and the generation ID that the cache memory generation ID was incremented to in response to the writing of the data to the cache memory. For example, the cache generation ID data structure may comprise an identification of one or more data blocks (e.g., a first set of data) that was written to at a first instance, time, and/or interval and thus stored on the cache memory and the generation ID that the generation ID of the cache memory was incremented to in response to the writing of the one or more data blocks to the cache memory. A second set of data (e.g., one or more data blocks) that was written to and thus stored on the cache memory at a later time (e.g., after the first set of data was written to the cache memory) may also be identified in the cache generation ID data structure and the generation ID that the generation ID of the cache memory was incremented to in response to the writing of the one or more data blocks of the second set of data to the cache memory. As such, in some embodiments, the cache generation ID data structure may comprise information to identify a plurality of sets of data that were written to the cache memory at different times and an incremented generation ID associated with each instance of the sets of data being written to the cache memory.

As shown in FIG. 7, the technique 700 may identify (at step 740) the generation ID in the cache generation ID data structure that matches the generation ID stored on the primary storage device and received at step 720. In some embodiments, the cache coherency engine 275 may make such identification. The cache generation ID data structure 290 may comprise a plurality of entries corresponding to each generation ID that the cache memory 291 has been incremented to and which data was written to the cache memory when the generation ID was incremented. In some embodiments, the cache generation ID data structure may be arranged in numerical order based on the generation ID. For example, the cache generation ID data structure may be arranged such that a low generation ID is placed before a higher generation ID. The technique 700 may invalidate (at step 750) the cache data associated with a greater generation ID than the generation ID stored on the primary storage device. For example, the cache coherency engine 275 may invalidate data by identifying data from the cache header data array structure associated with a larger generation ID and then marking a status of the data associated with the larger generation IDs as invalid for the primary storage device through the use of a cache status data structure. For example, the cache coherency engine 275 may use the cache generation ID data structure to identify which data to mark as invalid and then modifying a header of the data stored in the cache (e.g., as may be represented by a cache status data structure) to invalidate the cache data relative to the primary storage device with the lower generation ID. As such, headers of data stored on the cache memory may be modified or marked as invalid to invalidate the data block for a particular primary storage device (e.g., a primary storage device with a generation ID lower than a generation ID of the cache memory) such that when a request for data is received and a cache hit is detected, the data will not be transmitted from the cache if the request is for data for the particular primary storage device with the lower generation ID. As such, data from a data block that has been invalidated for a particular primary storage device may not be transmitted from the cache memory in response to a read request for data in the primary storage device. As such, each data block stored in the cache memory may be associated with a plurality of primary storage devices and each data block may be labeled or flagged as valid or invalid relative to each of the primary storage devices. The technique 700 may further keep (at step 760) as valid (and as such transmit in response to a cache hit) cache data associated with a generation ID that is less than or equal to the generation ID of the primary storage device.

Figure 8:
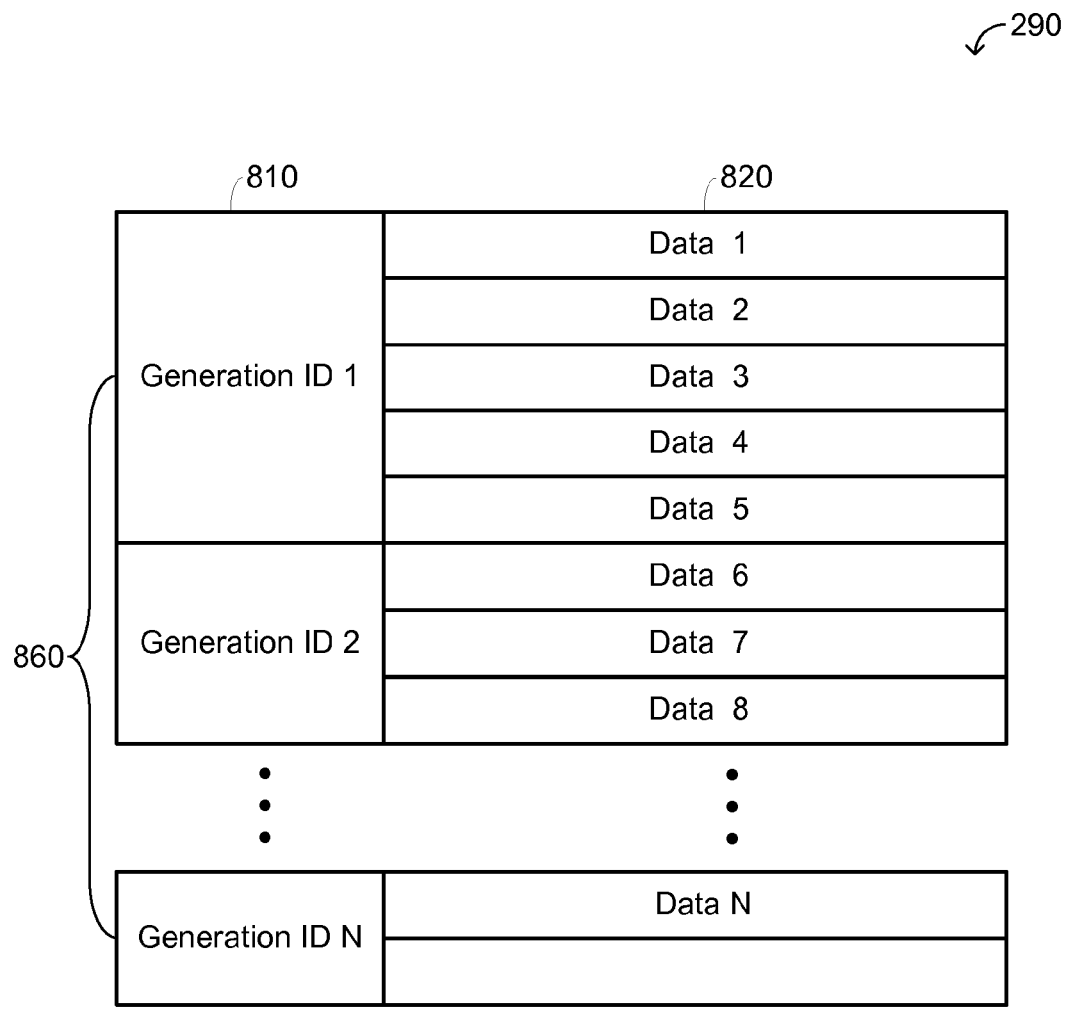
FIG. 8 shows an exemplary cache generation ID data structure used in accordance with some embodiments.

FIG. 8 shows an exemplary cache generation ID data structure 290 used in some embodiments. In some embodiments, the cache generation ID data structure 290 comprises a plurality of dataset entries 860, each dataset entry 860 representing a generation ID value and a data block identification. Each dataset entry 860 may comprise a plurality of data fields for storing data describing or identifying a generation ID written to the cache memory and associated data blocks that were written to the cache memory at the time when the generation ID was written to the cache memory. As such, in some embodiments, each dataset entry 860 identifies an incremented generation ID of a cache memory and the data blocks that were modified and/or written to the cache memory at the time of the incrementing of the generation ID.

In some embodiments, a cache generation ID data structure entry 860 representing an instance in time of data being written to a cache memory may contain data fields for a cache memory generation ID 810 and associated data blocks identification 820. The cache memory generation ID 810 may comprise information identifying a current or previous generation ID of the cache memory (e.g., cache memory 291). For example, the cache memory generation ID 810 may comprise a numerical value or other identification of a generation ID that is or was previously assigned to the cache memory. As such, in some embodiments, the cache memory generation ID 810 may correspond to any generation ID that has been incremented.

The associated data blocks identification 820 may identify data blocks that were written to the cache memory. For example, each data block identification 820 may be associated with a cache memory generation ID 810. In some embodiments, the data block identification 820 may be associated with a generation ID that was incremented when the data block from the data block identification 820 was written to the cache memory. As such, the cache generation ID data structure 290 may identify a particular generation ID and the data blocks that were written to the cache memory that are associated with the particular generation.

In some embodiments, the cache memory generation ID 810 and associated data blocks identification 820 may be generated or received when data is written to the cache memory and/or when data from one or more primary storage devices is written to the cache memory. For example, the cache generation ID data structure 290 may be updated whenever data is written to the cache memory device from one or more primary storage devices.

FIG. 9 shows an exemplary cache status data structure 310 used in some embodiments. In some embodiments, the cache status data structure may represent headers of data stored on the cache memory. In some embodiments, the cache status data structure 310 comprises a plurality of dataset entries 960, each dataset entry 960 representing a data block and a status of the data block relative to one or more primary storage devices. Each dataset entry 960 may comprise a plurality of data fields for storing data describing or identifying a status of a data block stored in the cache memory relative to one or more primary storage devices. As such, in some embodiments, each dataset entry 960 identifies a data block and a status of the data block relative to one or more primary storage devices.

In some embodiments, a cache status data structure entry 960 representing a data block stored in a cache memory may contain data fields for a data block identification 910 and a first primary storage device status 920, a second primary storage device status 930, and a third primary storage device status 940. The data block identification 910 may comprise information identifying a data block stored on a cache memory. As such, the data block identification 910 may identify the data blocks stored on the cache memory that may be transmitted in response to a read request for one or more of the primary storage devices.

The first primary storage device status 920, second primary storage device status 930, and third primary storage device status 940 may identify a status of a data block of the data block identification 910 relative to primary storage devices. In some embodiments, the status may indicate whether the data block of the data block identification 910 is valid or invalid for a primary storage device. In some embodiments, the first primary storage device status 920 may indicate a status of a first primary storage device for each data block of a cache memory. For example, the generation ID stored on the first primary storage device may be the same as a current generation ID stored on the cache memory. As such, the first primary storage device status 920 may indicate that the data blocks from data block identification 910 are all valid for the first primary storage device. In some embodiments, the second primary storage device status 930 may also indicate a status of a second primary storage device for each data block of a cache memory. In some embodiments, the generation ID stored on the second primary storage device may be less than the current generation ID stored on the cache memory. As such, the second primary storage device status 930 may indicate that some of the data blocks from the data block identification 910 are valid for the second primary storage device (e.g., the generation ID stored on the second primary storage device is the same or greater than the generation ID of a data block of the cache memory) and that some of the data blocks from the data block identification 910 are invalid for the second primary storage device (e.g., the generation ID stored on the second primary storage device is less than the generation ID of a data block). In some embodiments, the third primary storage device status 940 may indicate a status of a third primary storage device for each data block of a cache memory. In some embodiments, the third primary storage device status 940 may indicate that all of the data blocks of the cache memory are invalid for the third primary storage device (e.g., the generation ID stored on the third primary storage device is invalid or corrupted or the generation ID stored on the third primary storage device is larger than the current generation ID of the cache memory).

In some embodiments, the data block identification 910, first primary storage device status 920, second primary storage device status 930, and third primary storage device status 940 may be generated or received when data is written to the cache memory and/or when data from one or more primary storage devices is written to the cache memory. For example, the cache status data structure 310 may be updated whenever data is written to the cache memory device from one or more primary storage devices.

VARIOUS EMBODIMENTS

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A system, comprising at least one processor and memory, to maintain coherency of a cache memory device used by a plurality of primary storage devices for caching data, the system comprising:
   a cache coherency engine configured for:
      receiving a plurality of write operations to the cache memory device, each write operation corresponding to data to store on the cache memory device and is associated with a cache generation identification (ID) such that the cache generation ID is incremented for each write operation so that a last write operation to the cache memory device is associated with a highest cache generation ID;
      receiving a first primary storage device generation ID stored on a first primary storage device;
      comparing the highest cache generation ID to the first primary storage device generation ID; and updating a status of the data stored on the cache memory device based on the comparison of the highest cache generation ID to the first primary storage device generation ID such that data associated with a cache generation ID greater than the first primary storage device generation ID is marked as invalid for the first primary storage device.

2. The system of claim 1, wherein the updating of the status of the data further comprises marking data associated with a cache generation ID equal to or less than the first primary storage device generation ID as valid for the first primary storage device, the cache coherency engine is further configured for:
- receiving a read request for data stored on the first primary storage device;
- determining if the data stored on the cache memory device comprises a duplicate of the requested data stored on the first primary storage device; and
- transmitting the duplicate from the cache memory device if data associated with the duplicate is marked as valid and not transmitting the duplicate from the cache memory device if the data associated with the duplicate is marked as invalid.

3. The system of claim 1, wherein the cache coherency engine is further configured for:
- receiving a second primary storage device generation ID stored on a second primary storage device; and
- comparing the highest cache generation ID to the second primary storage device generation ID, the updating of the status of the data stored on the cache memory device is further performed for the second primary storage device based on the comparison of the highest cache generation ID to the second primary storage device generation ID such that the data stored on the cache memory device may be valid for the second primary storage device and invalid for the first primary storage device.

4. The system of claim 1, wherein the cache coherency engine is further configured for:
- receiving a backup restore notification associated with the first primary storage device, the receiving of the first primary storage device generation ID, the comparing, and the updating are performed in response to the backup restore notification.

5. The system of claim 1, wherein the first primary storage device comprises at least two partitions, a first partition is used to store data to be transmitted in response to a read request and a second partition is used to store the first primary storage device generation ID.

6. The system of claim 1, wherein the updating of the status of the data further comprises marking all of the data stored on the cache memory device as invalid for the first primary storage device if the first primary storage device generation ID is greater than the highest cache generation ID.

7. The system of claim 1, wherein the cache coherency engine is further configured for:
- writing, in response to the incrementing of the cache generation ID, the incremented cache generation ID to each of the primary storage device to replace the first primary storage device generation ID.

8. A method to maintain coherency of a cache memory device used by a plurality of primary storage devices for caching data, the method comprising:
- using computer hardware for performing:
  - receiving a plurality of write operations to the cache memory device, each write operation corresponding to data to store on the cache memory device and is associated with a cache generation identification (ID) such that the cache generation ID is incremented for each write operation so that a last write operation to the cache memory device is associated with a highest cache generation ID;
  - receiving a first primary storage device generation ID stored on a first primary storage device;
  - comparing the highest cache generation ID to the first primary storage device generation ID; and
  - updating a status of the data stored on the cache memory device based on the comparison of the highest cache generation ID to the first primary storage device generation ID such that data associated with a cache generation ID greater than the first primary storage device generation ID is marked as invalid for the first primary storage device.

9. The method of claim 8, wherein the updating of the status of the data further comprises marking data associated with a cache generation ID equal to or less than the first primary storage device generation ID as valid for the first primary storage device the computer hardware further performs:
- receiving a read request for data stored on the first primary storage device;
- determining if the data stored on the cache memory device comprises a duplicate of the requested data stored on the first primary storage device; and
- transmitting the duplicate from the cache memory device if data associated with the duplicate is marked as valid and not transmitting the duplicate from the cache memory device if the data associated with the duplicate is marked as invalid.

10. The method of claim 8, wherein the computer hardware further performs:
- receiving a second primary storage device generation ID stored on a second primary storage device; and
- comparing the highest cache generation ID to the second primary storage device generation ID, the updating of the status of the data stored on the cache memory device is further performed for the second primary storage device based on the comparison of the highest cache generation ID to the second primary storage device generation ID such that the data stored on the cache memory device may be valid for the second primary storage device and invalid for the first primary storage device.

11. The method of claim 8, wherein the computer hardware further performs:
- receiving a backup restore notification associated with the first primary storage device, the receiving of the first primary storage device generation ID, the comparing, and the updating are performed in response to the backup restore notification.

12. The method of claim 8, wherein the first primary storage device comprises at least two partitions, a first partition is used to store data to be transmitted in response to a read request and a second partition is used to store the first primary storage device generation ID.

13. The method of claim 8, wherein the updating of the status of the data further comprises marking all of the data stored on the cache memory device as invalid for the first primary storage device if the first primary storage device generation ID is greater than the highest cache generation ID.

14. The method of claim 8, wherein the computer hardware further performs:
- writing, in response to the incrementing of the cache generation ID, the incremented cache generation ID to each of the primary storage device to replace the first primary storage device generation ID.

15. A non-transitory computer readable medium carrying one or more instructions for maintaining cache coherency of a cache memory shared by a plurality of storage devices, wherein the one or more instructions, when executed by one or more processors, causes the one or more processors to perform the steps of:
receiving a plurality of storage device generation identifications (IDs), each storage device is associated with one of the storage device generation IDs;
receiving a current cache generation ID associated with a cache memory that is shared by each of the storage devices, the cache memory comprises a plurality of data blocks, each data block is associated with the current cache generation ID or one of a plurality of previous cache generation IDs, the current cache generation ID and each of the previous cache generation IDs are associated with a time when the data blocks were written to the cache memory such that the current cache generation ID is associated with a last time when data blocks were written to the cache memory;
comparing the current cache generation ID to each of the storage device generation IDs; and
updating a status of the data blocks stored on the cache memory based on the comparison of the current cache generation ID and each of the storage device generation IDs, the updating is performed on one or more data blocks if the current cache generation ID is greater than at least one of the storage device generation IDs, the updating is not performed if the current cache generation ID is equal to each of the storage device generation IDs.

16. The non-transitory computer readable medium of claim 15, wherein the updating comprises marking a data block of the cache memory as invalid for a first storage device if the cache generation ID associated with the data block is greater than a storage device generation ID of the first storage device.

17. The non-transitory computer readable medium of claim 16, wherein the data block marked as invalid will not be transmitted in response to a read request for a corresponding data block on the first storage device.

18. The non-transitory computer readable medium of claim 15, wherein the steps are performed in response to receiving a backup restore notification to at least one of the storage devices.

19. The non-transitory computer readable medium of claim 15, wherein the updating of the status of the data blocks further comprises marking all of the data blocks stored on the cache memory as invalid for a first storage device if a first storage device generation ID is greater than the current cache generation ID.

20. The non-transitory computer readable medium of claim 15, wherein each of the cache generation IDs is associated with a distinct value such that each subsequent time when data blocks are written to the cache memory results in an incrementing of the current cache generation ID.

* * * * *